(12) United States Patent
Chaudhry et al.

(10) Patent No.: US 7,343,499 B2
(45) Date of Patent: Mar. 11, 2008

(54) METHOD AND APPARATUS TO GENERATE CIRCUIT ENERGY MODELS WITH MULTIPLE CLOCK GATING INPUTS

(75) Inventors: Rajat Chaudhry, Austin, TX (US); James Scott Neely, Wappingers Falls, NY (US); Daniel Lawrence Stasiak, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 11/044,568

(22) Filed: Jan. 27, 2005

(65) Prior Publication Data

US 2006/0168456 A1 Jul. 27, 2006

(51) Int. Cl.
G06F 17/50 (2006.01)
G06F 1/00 (2006.01)

(52) U.S. Cl. ............................... 713/300; 716/1; 716/4

(58) Field of Classification Search ................ 713/300, 713/323, 324; 716/4
See application file for complete search history.

(56) References Cited

U.S. PATENT DOCUMENTS

| 5,227,672 | A | 7/1993 | Sawtell | |
|---|---|---|---|---|
| 6,212,665 | B1 | 4/2001 | Zarkesh | |
| 6,345,379 | B1 | 2/2002 | Khouja | |
| 6,397,170 | B1 * | 5/2002 | Dean et al. | 703/14 |
| 6,810,482 | B1 | 10/2004 | Saxena | |
| 7,051,300 | B1 * | 5/2006 | Shen et al. | 716/4 |
| 2002/0171483 | A1 | 11/2002 | Shinjo | |
| 2003/0085732 | A1 | 5/2003 | Hernandez-Marti | |
| 2004/0019859 | A1 | 1/2004 | Ravi | |
| 2004/0239189 | A1 | 12/2004 | Sundstrom | |
| 2005/0030268 | A1 | 2/2005 | Zhang | |
| 2005/0050481 | A1 | 3/2005 | Keller | |
| 2005/0050495 | A1 | 3/2005 | McGuffin | |
| 2005/0091427 | A1 | 4/2005 | Yoshida | |
| 2005/0102643 | A1 | 5/2005 | Hou | |
| 2005/0159907 | A1 | 7/2005 | Chaudhry | |
| 2006/0031795 | A1 | 2/2006 | Rahmat | |
| 2006/0080076 | A1 | 4/2006 | Lahiri | |
| 2006/0167673 | A1 * | 7/2006 | Chaudhry et al. | 703/18 |
| 2006/0168456 | A1 * | 7/2006 | Chaudhry et al. | 713/300 |
| 2006/0168490 | A1 | 7/2006 | McCormack | |
| 2006/0190856 | A1 * | 8/2006 | Chaudhry et al. | 716/4 |

* cited by examiner

*Primary Examiner*—Mark Connolly
(74) *Attorney, Agent, or Firm*—Carr LLP; D'Ann N. Rifai

(57) ABSTRACT

A method, a computer program, and an apparatus are provided for generating circuit energy models for a macro using multiple clock gating inputs. Circuit energy models are used to estimate system power consumption. The present invention enables circuit energy models to be created for macros that contain multiple clock gating inputs. Energy tables are created based upon the macro's input switching factor and the clock activation percentage. The clock activation percentage is produced by turning on and off the multiple clock gating inputs during the simulations. These energy tables are generated from a minimum number of power simulations. By using clock activation percentage as a parameter accurate power estimations are produced.

4 Claims, 10 Drawing Sheets

| CLOCK ACTIVITY | | | | | | | | |
|---|---|---|---|---|---|---|---|---|
| ACT 1,2,3 = 111 | 0 | 10 | 20 | 30 | 40 | 50 | SWITCHING FACTOR | |
| 0 | 0.00 | 0.10 | 0.20 | 0.30 | 0.40 | 0.50 | | |
| 20 | 0.10 | 0.20 | 0.30 | 0.40 | 0.50 | 0.60 | | |
| 40 | 0.20 | 0.30 | 0.40 | 0.50 | 0.60 | 0.70 | | |
| 60 | 0.30 | 0.40 | 0.50 | 0.60 | 0.70 | 0.80 | | |
| 80 | 0.40 | 0.50 | 0.60 | 0.70 | 0.80 | 0.90 | | |
| 100 | 0.50 | 0.60 | 0.70 | 0.80 | 0.90 | 1.00 | | |
| ACT 1,2,3 = 110 | 0 | 10 | 20 | 30 | 40 | 50 | SWITCHING FACTOR | |
| 0 | 0.00 | 0.07 | 0.13 | 0.20 | 0.27 | 0.33 | | |
| 20 | 0.07 | 0.13 | 0.20 | 0.27 | 0.33 | 0.40 | | |
| 40 | 0.13 | 0.20 | 0.27 | 0.33 | 0.40 | 0.46 | | |
| 60 | 0.20 | 0.27 | 0.33 | 0.40 | 0.46 | 0.53 | | |
| 80 | 0.27 | 0.33 | 0.40 | 0.46 | 0.53 | 0.59 | | |
| 100 | 0.33 | 0.40 | 0.46 | 0.53 | 0.59 | 0.66 | | |
| ACT 1,2,3 = 100 | 0 | 10 | 20 | 30 | 40 | 50 | SWITCHING FACTOR | |
| 0 | 0.00 | 0.03 | 0.07 | 0.10 | 0.13 | 0.17 | | |
| 20 | 0.03 | 0.07 | 0.10 | 0.13 | 0.17 | 0.20 | | |
| 40 | 0.07 | 0.10 | 0.13 | 0.17 | 0.20 | 0.23 | | |
| 60 | 0.10 | 0.13 | 0.17 | 0.20 | 0.23 | 0.27 | | |
| 80 | 0.13 | 0.17 | 0.20 | 0.23 | 0.27 | 0.30 | | |
| 100 | 0.17 | 0.20 | 0.23 | 0.27 | 0.30 | 0.33 | | |

900

| | SWITCHING FACTOR % | | | | | |
|---|---|---|---|---|---|---|
| | 0 | 10 | 20 | 30 | 40 | 50 |
| POWER | <u>0</u> | .1 | .2 | .3 | .4 | <u>.5</u> |

UNDERLINED VALUES FROM SIMULATION
BLACK VALUES LINEAR ESTIMATES

| CLOCK ACTIVE % | SWITCHING FACTOR % | | | | | |
|---|---|---|---|---|---|---|
| | 0 | 10 | 20 | 30 | 40 | 50 |
| 0 | <u>0</u> | .1 | .2 | .3 | .4 | <u>.5</u> |
| 20 | .1 | .2 | .3 | .4 | .5 | .6 |
| 40 | .2 | .3 | .4 | .5 | .6 | .7 |
| 60 | .3 | .4 | .5 | .6 | .7 | .8 |
| 80 | .4 | .5 | .6 | .7 | .8 | .9 |
| 100 | <u>.5</u> | .6 | .7 | .8 | .9 | <u>1.0</u> |

UNDERLINED VALUES FROM SIMULATION
BLACK VALUES LINEAR ESTIMATES

| CLOCK ACTIVITY | | | | | | | SWITCHING FACTOR |
|---|---|---|---|---|---|---|---|
| ACT 1,2,3 = 111 | 0 | 10 | 20 | 30 | 40 | 50 | |
| 0 | 0.00 | 0.10 | 0.20 | 0.30 | 0.40 | 0.50 | |
| 20 | 0.10 | 0.20 | 0.30 | 0.40 | 0.50 | 0.60 | |
| 40 | 0.20 | 0.30 | 0.40 | 0.50 | 0.60 | 0.70 | |
| 60 | 0.30 | 0.40 | 0.50 | 0.60 | 0.70 | 0.80 | |
| 80 | 0.40 | 0.50 | 0.60 | 0.70 | 0.80 | 0.90 | |
| 100 | 0.50 | 0.60 | 0.70 | 0.80 | 0.90 | 1.00 | |
| ACT 1,2,3 = 110 | 0 | 10 | 20 | 30 | 40 | 50 | SWITCHING FACTOR |
| 0 | 0.00 | 0.07 | 0.13 | 0.20 | 0.27 | 0.33 | |
| 20 | 0.07 | 0.13 | 0.20 | 0.27 | 0.33 | 0.40 | |
| 40 | 0.13 | 0.20 | 0.27 | 0.33 | 0.40 | 0.46 | |
| 60 | 0.20 | 0.27 | 0.33 | 0.40 | 0.46 | 0.53 | |
| 80 | 0.27 | 0.33 | 0.40 | 0.46 | 0.53 | 0.59 | |
| 100 | 0.33 | 0.40 | 0.46 | 0.53 | 0.59 | 0.66 | |
| ACT 1,2,3 = 100 | 0 | 10 | 20 | 30 | 40 | 50 | SWITCHING FACTOR |
| 0 | 0.00 | 0.03 | 0.07 | 0.10 | 0.13 | 0.17 | |
| 20 | 0.03 | 0.07 | 0.10 | 0.13 | 0.17 | 0.20 | |
| 40 | 0.07 | 0.10 | 0.13 | 0.17 | 0.20 | 0.23 | |
| 60 | 0.10 | 0.13 | 0.17 | 0.20 | 0.23 | 0.27 | |
| 80 | 0.13 | 0.17 | 0.20 | 0.23 | 0.27 | 0.30 | |
| 100 | 0.17 | 0.20 | 0.23 | 0.27 | 0.30 | 0.33 | |

FIG. 9

METHOD AND APPARATUS TO GENERATE CIRCUIT ENERGY MODELS WITH MULTIPLE CLOCK GATING INPUTS

FIELD OF THE INVENTION

The present invention relates generally to power estimation in chip design, and more particularly, to generating an energy table for a circuit with multiple clock gating inputs.

DESCRIPTION OF THE RELATED ART

System power is an important issue in Very Large-Scale Integration (VLSI) chip design. Battery life, packaging cost, and power delivery cost are factors that are affected by chip power consumption. Power estimates are used in place of methodical testing or methodical simulation to save time and resources. These estimates can be produced from a minimal number of simulations or tests. To lower the power consumption of a particular chip design it is important that the power estimates are accurate.

Chip power estimation starts at the macro level. A chip is made up of many macros, which are small circuits within the chip. Each macro within a chip generates an energy model or rule. Referring to FIG. 1 of the drawings, reference numeral 100 generally designates a block diagram depicting a macro that receives inputs and generates signal outputs. The latch macro 108 receives data inputs 102 and control inputs 104. The data inputs 102 are random and depend upon other circuits and signals within the system. The control inputs 104 are random or specified, which means that they can depend upon other circuits and signals within the system or they can be controlled to produce desired signal outputs. The latch macro 108 produces the signal outputs 106 in response to the data inputs 102 and the control inputs 104.

Referring to FIG. 2 of the drawings, reference numeral 200 generally designates a hypothetical power table that estimates the power consumption of a macro based upon the input switching factor percentage. The input switching factor refers to the data inputs 102 and how often they change state. Therefore, a 50% switching factor would indicate that the data inputs 102 change states every other cycle. The switching factor percentages in this table run from 0% to 50%. Simulations were done to accurately estimate the power consumption at a 0% switching factor and at a 50% switching factor. The rest of the values in the table are linear estimates based upon the simulation results. Based upon these values, the power consumption of this specific macro at any input switching factor between 0% and 50% can be accurately estimated. Furthermore, if the power consumption of the macros within a chip can be estimated, then the power consumption of the whole chip can be estimated.

SUMMARY OF THE INVENTION

The present invention provides a method, a computer program, and an apparatus for generating circuit energy models for a macro using multiple clock gating inputs. Accurate circuit energy models are important for estimating the power consumption of a specific chip. The estimation process begins by estimating the power consumption of macros within the chip, which leads to a power estimation of the whole chip. This invention provides a means to produce energy models based upon two parameters: input switching factor percentage and clock activation percentage.

To produce these energy models the specific macro must be represented in a computer program. From this model circuit power simulations can be generated for any combination of input switching factor percentages and clock activation percentages. With multiple clock gating inputs the clock activation percentage can be estimated by turning on and off the clock gating inputs to represent the desired clock activation percentage. For example, if there are two clock gating inputs then turning one on and turning one off simulates a 50% clock activation percentage. After these power simulations are generated the rest of the values in the energy table are produced in a linear fashion. The resulting energy table contains accurate power estimations of a macro with multiple gating inputs for a wide variety of input switching factor percentages and clock activation percentages.

BRIEF DESCRIPTION OF THE DRAWINGS

For a more complete understanding of the present invention and the advantages thereof, reference is now made to the following descriptions taken in conjunction with the accompanying drawings, in which:

FIG. 2 is a hypothetical power table that estimates the power consumption of a macro based upon the input switching factor percentage;

FIG. 5 is a block diagram illustrating a macro with clock gating on;

FIG. 6 is a hypothetical energy table that estimates the power consumption of a macro based upon the input switching factor percentage and the clock activation percentage;

FIG. 9 is a hypothetical power table that estimates the power consumption of a macro that receives three clock activate signals based upon the input switching factor percentage and the clock activation percentage.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic, block diagram or flow chart form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

The power simulations of these macros are accomplished by computer software programs. Typically, one computer program sets up the circuits and the inputs into the circuits and another computer program carries out the simulation. The former computer program can be described as a design methodology and tool set for detailed analysis of power, as well as on-chip noise and reliability of the network. For one example, a Common Power Analysis Methodology for microprocessors (CPAM) program allows a user to set up a specific macro, including accurate input states that can be utilized for macro power simulations. The other computer program is used to provide quick, accurate power simulations. For one example, ACES is a fast circuit simulator program that allows a user to accomplish timing simulations, static timing analysis, noise analysis, and power analysis. In combination these computer programs provide accurate power simulations.

Referring to FIG. 2, programs like CPAM and ACES provide the simulated power estimates that are required to make the energy table. These power estimates are created by setting up the circuit and the correct input states through CPAM. Then an ACES simulation is used to produce the power estimates. Signals are held high, low or switched high and low in a particular sequence or randomly. Based upon the input pins switching factor CPAM generates a table of the power estimates for the circuit. As shown in FIG. 2, CPAM generates an estimate at 0% switching factor and an estimate at 50% switching factor and then generates the rest of the table values in a linear fashion.

Figure 1:
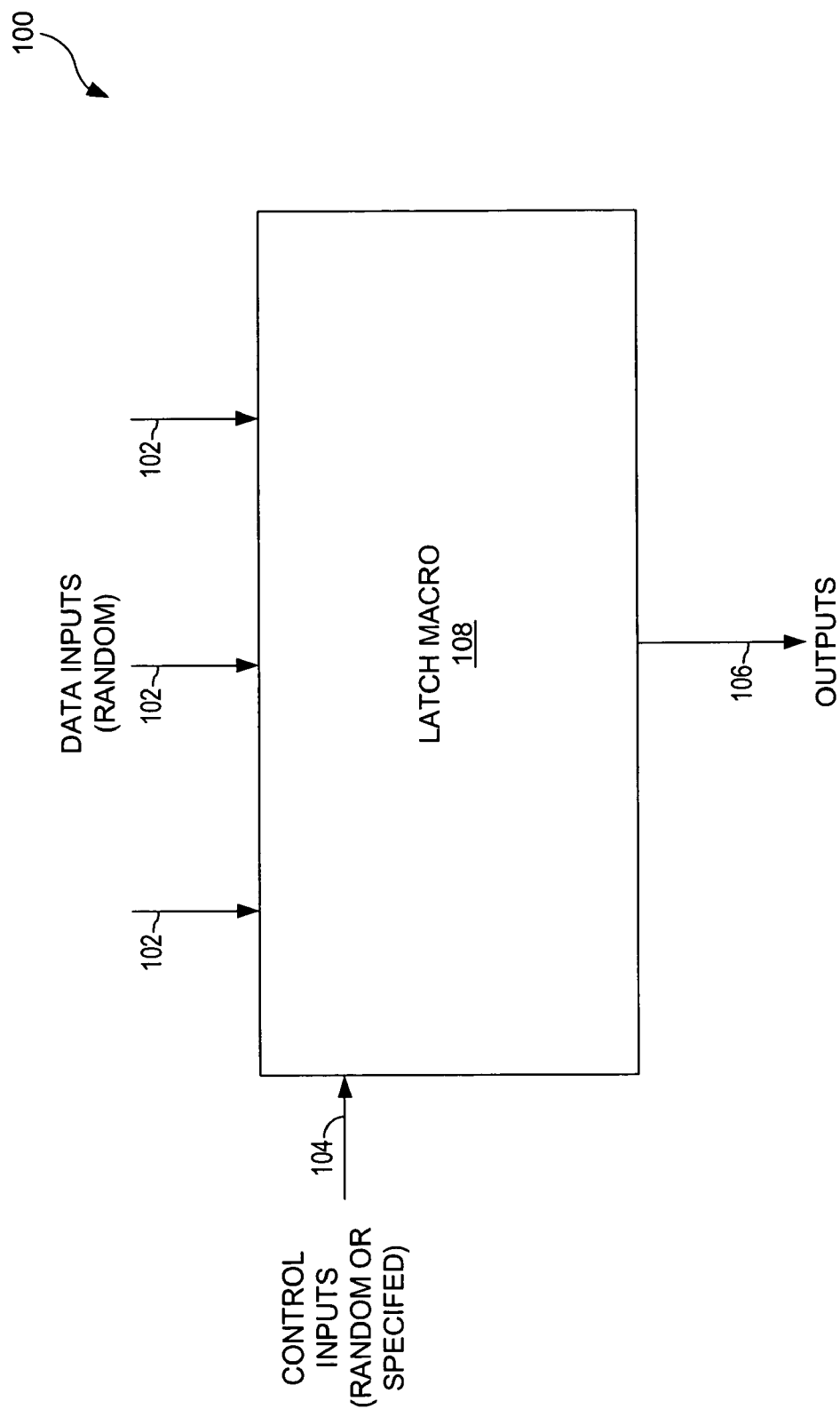
FIG. 1 is a block diagram depicting a macro that receives inputs and generates signal outputs.
Figure 3:
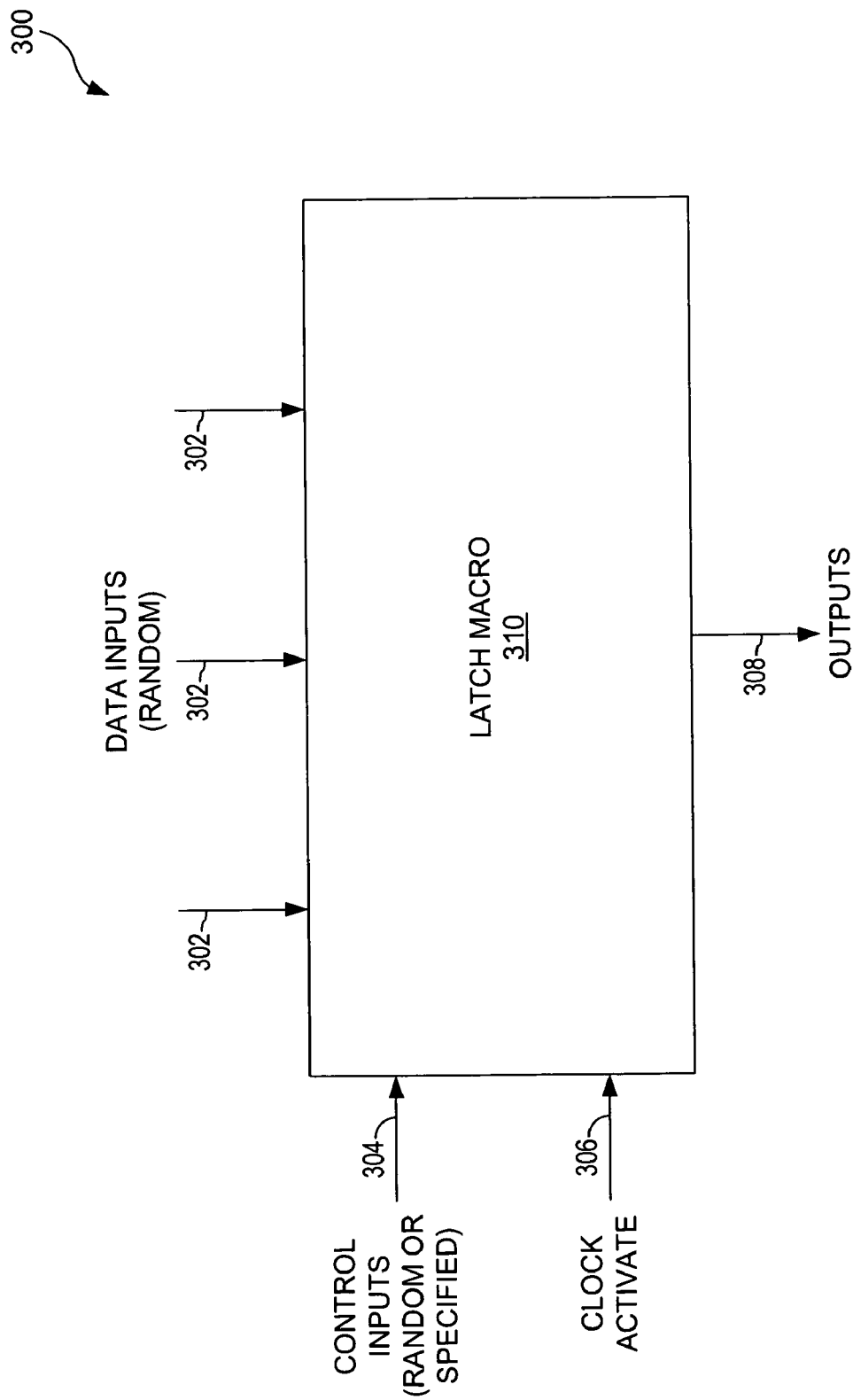
FIG. 3 is a block diagram depicting a macro that receives signal inputs, a clock signal, and a clock activate signal, and generates signal outputs.

Referring to FIG. 3 of the drawings, reference numeral 300 generally designates a block diagram depicting a macro that receives signal inputs, a clock signal, and a clock activate signal, and generates signal outputs. The conventional methods for producing a power table were unable to estimate the power of a macro that received a clock activate signal along with the control inputs. The latch macro 310 receives data inputs 302, control inputs 304, and a clock activate signal 306. The data inputs 302 are random and depend upon other circuits and signals within the system. The control inputs 304 are random or specified, which means that they can depend upon other circuits and signals within the system, or they can be controlled to produce desired output signals. The clock activate signal 306 is used to enable or disable a clock signal. This clock signal would be a control input 304 of the latch macro 310. The latch macro 310 produces signal outputs 308 in response to the data inputs 302, the control inputs 304, and the clock activate signal 306.

Figure 4:
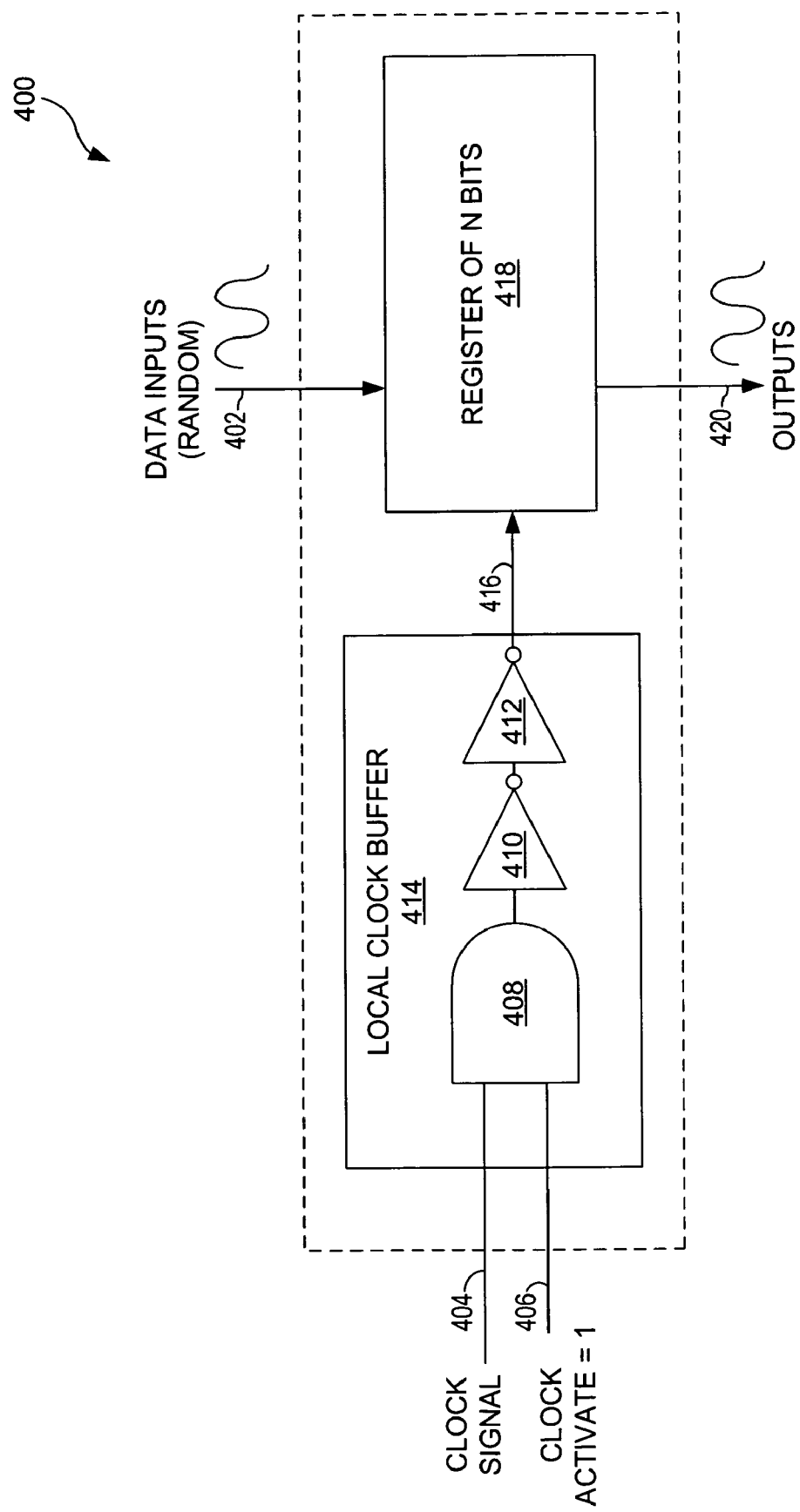
FIG. 4 is a block diagram illustrating a macro with clock gating off.

Referring to FIG. 4 of the drawings, reference numeral 400 generally designates a block diagram illustrating a macro with clock gating off. FIG. 4 is a more detailed illustration of FIG. 3 with the clock activate signal 406 being implemented to turn the clock gating off. The clock signal 404 and the clock activate signal 406 are inputs into the local clock buffer 414. The local clock buffer is made up of an AND gate 408 connected to two inverters 410 and 412. The output 416 of the local clock buffer 414 is an input to a register 418. The data inputs 402 are also received by the register 418. The register produces signal outputs 420 in response to the local clock buffer 414 and the data inputs 402. By setting the clock activate signal 406 to "1," the AND gate 408 is enabled and the output 416 is a time delayed version of the clock signal 404. Therefore, the signal outputs 420 are a wave-like transformation of the data inputs 402. When the clock activate signal 406 is set to "1" the clock gating is off.

Figure 5:
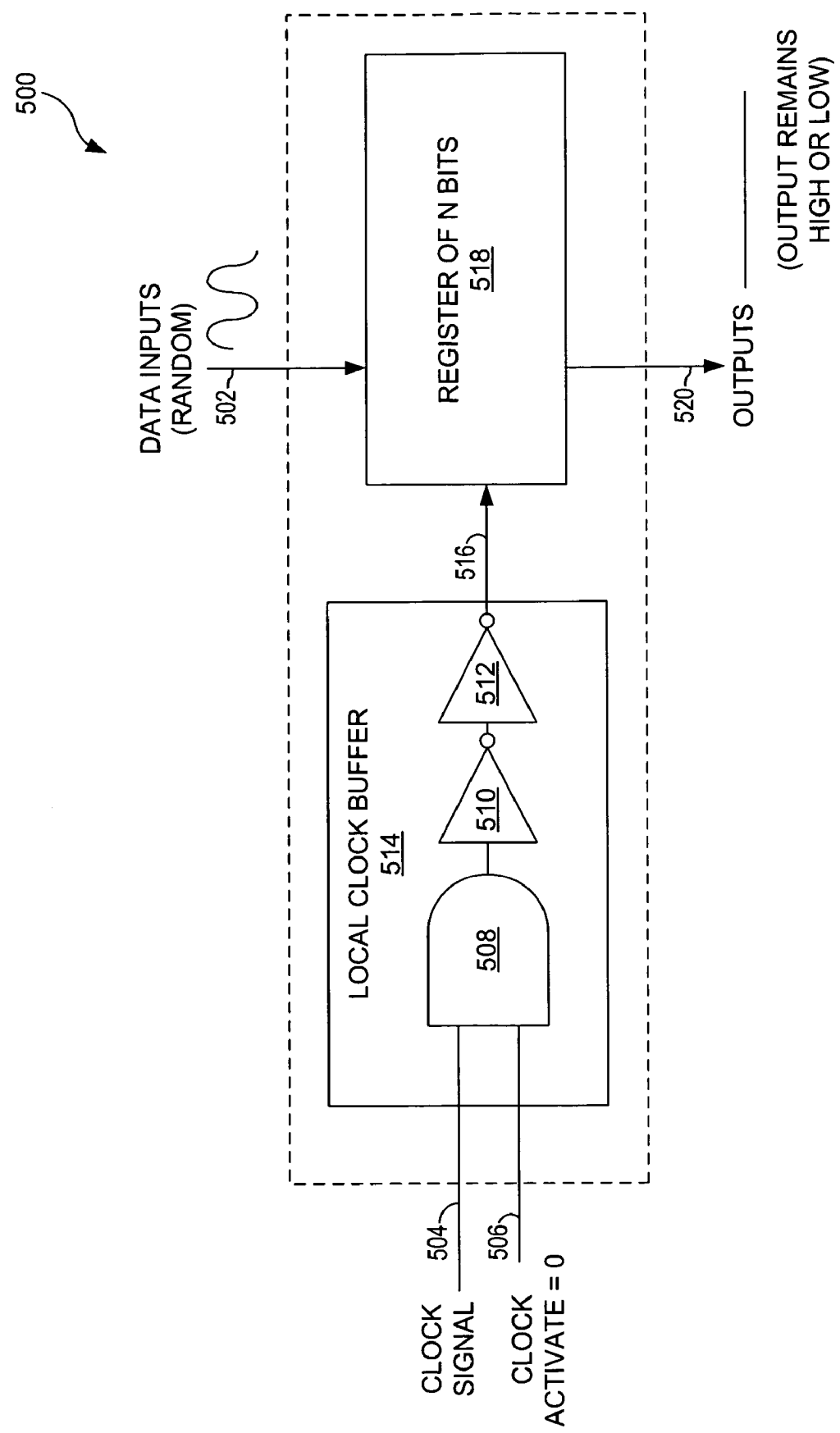

Referring to FIG. 5 of the drawings, reference numeral 500 generally designates a block diagram illustrating a macro with clock gating on. FIG. 5 is a more detailed illustration of FIG. 3 with the clock activate signal 506 being implemented to turn the clock gating on. The clock signal 504 and the clock activate signal 506 are inputs into the local clock buffer 514. The local clock buffer is made up of an AND gate 508 connected to two inverters 510 and 512. The output 516 of the local clock buffer 514 is an input to a register 518. The data inputs 502 are also received by the register 518. The register produces signal outputs 520 in response to the local clock buffer 514 and the data inputs 502. By setting the clock activate signal 506 to "0," the AND gate 508 is shut off and the output 516 remains high or low based upon the number of inverters in the local clock buffer 514. Therefore, the signal outputs 520 remain high or low due to the local clock buffer output 516. When the clock activate signal 506 is set to "0" the clock gating is on.

Referring to FIG. 6 of the drawings, reference numeral 600 generally designates a hypothetical energy table that estimates the power consumption of a macro based upon the input switching factor percentage and the clock activation percentage. Computer programs, such as CPAM and ACES, are used to generate these power tables. Once again, only a few values are estimated through simulation and the rest of the table is generated in a linear fashion. In this table the two parameters that affect power consumption are input switching factor percentage and clock activation percentage. Clock activation percentage can be described as the percentage of time that clock gating is off in the macro. FIG. 4 provides an illustration of a macro with clock gating off. Accordingly, if clock gating is always off then the clock activation percentage would be 100%. If clock gating is always on then the clock activation percentage would be 0%. The clock activation percentage can also be used if there are two local clock buffers. For example, if one local clock buffer always has clock gating off and another local clock buffer always has clock gating on, then the clock activation percentage would be 50%. Furthermore, if both local clock buffers have clock gating off half of the time then the clock activation percentage is also 50%. This table provides accurate power estimates for a macro with an input switching factor between 0% and 50% and a clock activation between 0% and 100%.

This table is created by simulating the power estimates for the macro in four separate scenarios. For one embodiment, first the computer programs simulate the macro with a 0% switching factor and a 0% clock activation and load the power estimate into the table. Then, a simulation for a 50% switching factor and a 0% clock activation is accomplished and the power estimate is loaded into the table. Next, a simulation for a 0% switching factor and a 100% clock activation is carried out and the power estimate is loaded into the table. Lastly, the computer programs simulate the macro with a 50% switching factor and a 100% clock activation and load the power estimate into the table. After these four simulations are finished, the computer programs fill in the rest of the table in linear fashion.

Figure 7:
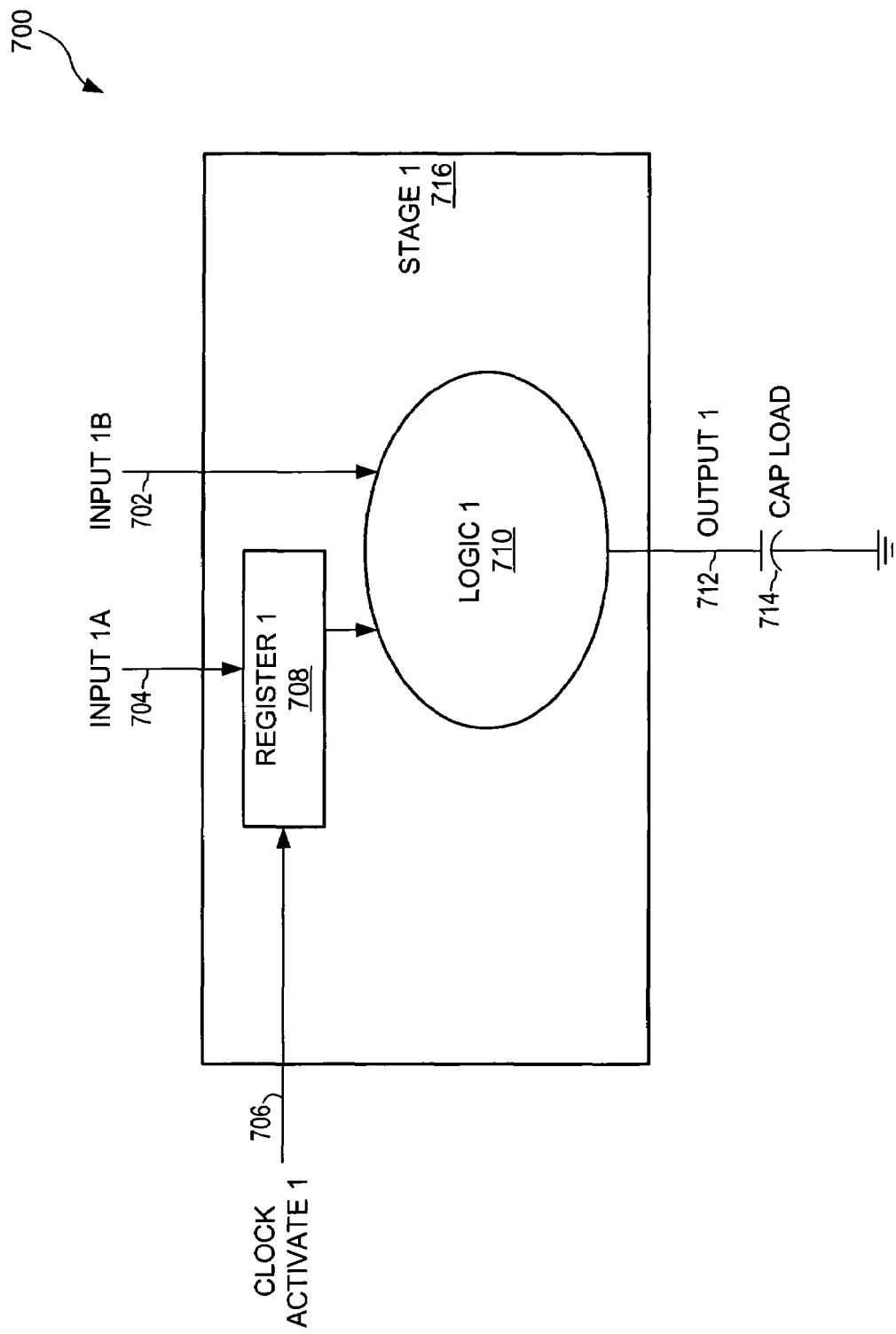
FIG. 7 is a block diagram depicting a macro that receives one clock activate signal.

Referring to FIG. 7 of the drawings, reference numeral 700 generally designates a block diagram depicting a macro that receives one clock activate signal. Register 1 708 receives input 1A 704 and a clock activate 1 signal 706 as inputs. The output of register 1 708 is transmitted to logic 1 710. Input 1B 702 is also an input of logic 1 710. In response to input 1B 702 and the output of register 1 708, logic 1 710 produces an output 1 signal 712. A capacitor 714 is used to provide the wire load on the output driver signal 712. This capacitor 714 is connected to ground. Register 1 708 and logic 1 710 make up stage 1 716 of the macro. Reference numeral 700 illustrates a simple one stage macro.

Figure 8:
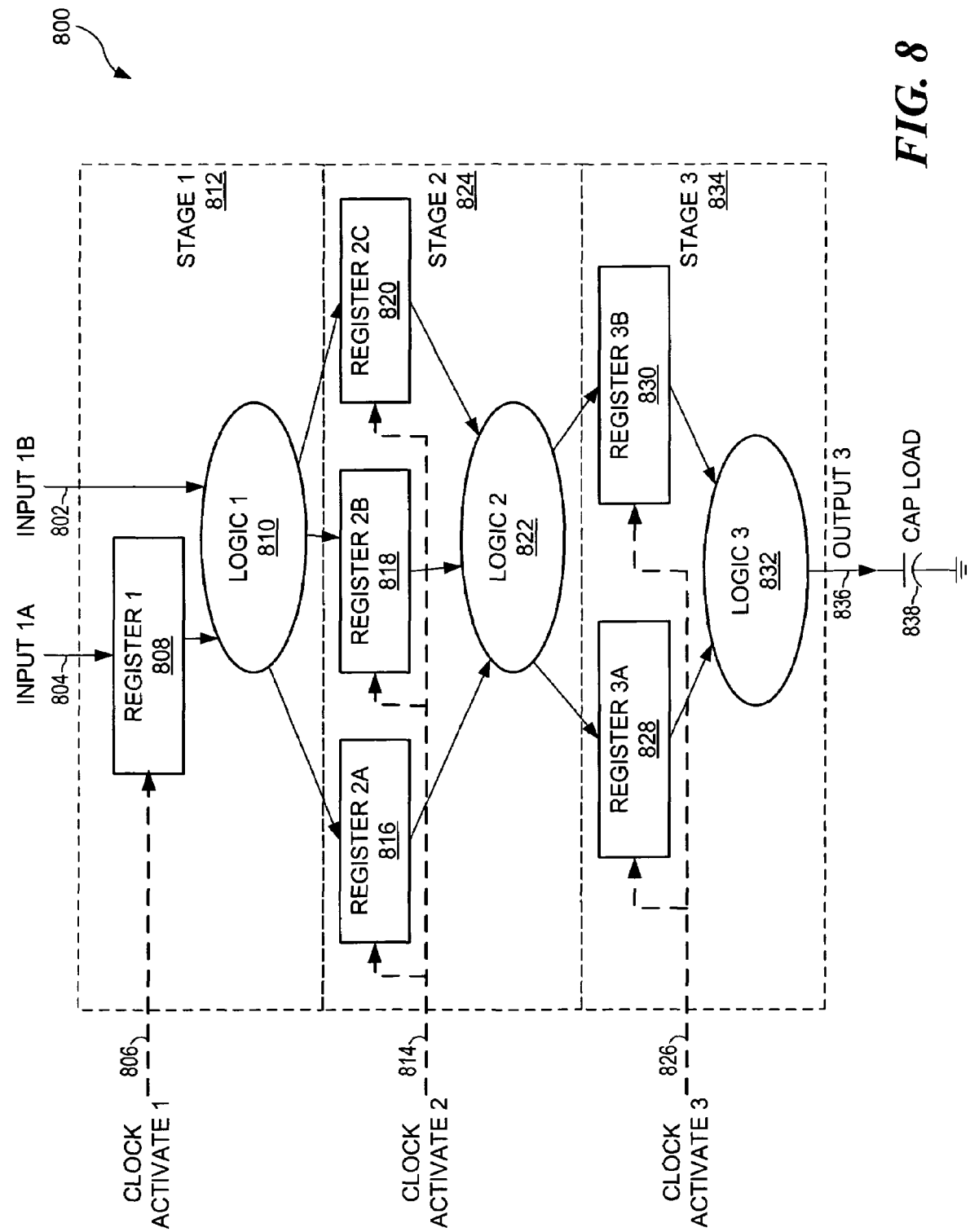
FIG. 8 is a block diagram depicting a macro that receives three clock activate signals.

Referring to FIG. 8 of the drawings, reference numeral 800 generally designates a block diagram depicting a macro that receives three clock activate signals. Reference numeral 800 illustrates a three stage macro. The dotted lines refer to the clock activate signals 806, 814, and 826. Register 1 808 receives input 1A 804 and clock activate 1 806 as inputs. The output of register 1 808 is transmitted to logic 1 810. Logic 1 810 also receives input 1B 802. Register 1 808 and logic 1 810 make up the first stage 812 of the macro. The output signal of logic 1 806 is transmitted to register 2A 816, register 2B 818, and register 2C 820. Registers 2A 816, 2B 818, and 2C 820 also receive the clock activate 2 signal 814. The outputs of Registers 2A 816, 2B 818, and 2C 820 are transmitted to Logic 2 822. Logic 2 822, register 2A 816, register 2B 818, and register 2C 820 make up the second stage 824 of the macro.

The output of logic 2 822 is transmitted to register 3A 828 and register 3B 830. Registers 3A 828 and 3B 830 also receive the clock activate 3 signal 826. The outputs of register 3A 828 and register 3B 830 are transmitted to logic 3 832. Logic 3 832, register 3A 828, and register 3B 830 make up the third stage 834 of the macro. Logic 3 832 produces the output signal 836 of this macro. A capacitor 838 is used to provide the wire load on the output driver 3 signal 836. This capacitor 838 is connected to ground. Overall, this macro 800 receives three clock activation signals and contains three stages. With three clock activation signals it is more difficult to create an energy table for this macro.

Referring to FIG. 9 of the drawings, reference numeral 900 generally designates a hypothetical power table that estimates the power consumption of a macro that receives three clock activate signals based upon the input switching factor percentage and the clock activation percentage. This table uses switching factor percentage and clock activation percentage to estimate the power consumption of this macro. The switching factor percentage ranges from 0% to 50%. The clock activation percentage ranges from 0% to 100%. Only three combinations are accounted for in this table. ACT 1, 2, 3=111 indicates that all three clock activation signals are clock gated on. ACT 1, 2, 3=110 indicates that the first two activation signals are clock gated on and the third activation signal is clock gated off. ACT 1, 2, 3=100 indicates that the first clock activation signal is clock gated on and the second and third activation signals are clock gated off. Essentially, this table 900 consists of three smaller tables. This table 900 is created by the same method as table 600.

Using the power table 900 with only three combinations it is possible to determine a power estimate for every combination of clock activation signals. For example, the macro power estimate when only the second clock activation signal is clock gated on at a 10% switching factor can be determined by the following equation:

Power (ACT 1, 2, 3 is 010 @ 10%)=Power (ACT 1, 2, 3 is 110 @ 10%)−Power (ACT 1, 2, 3 is 100 @ 10%)

The macro power estimate when the first and the third clock activation signals are clock gated on can be determined by the following equation:

Power (ACT 1, 2, 3 is 101 @ 10%)=Power (ACT 1, 2, 3 is 111 @ 10%)−Power (ACT 1, 2, 3 is 110 @ 10%)+Power (ACT 1, 2, 3 is 100 @ 10%)

Through the use of the table 900 and these equations the power estimate for any possible clock activation signal combination can be determined. Accuracy of this formula does require thoughtful consideration of how the clock activation signals work within the macro and what table combination should be generated. For example, no switching activity reaches the third stage if Stages 1 and 2 are shut off, therefore a Stage 3 power simulation would not be accurate depiction of the power consumption. For an accurate power estimate from a macro with only the third clock activation signal clock gated on, it is necessary to set up for Stages 1, 2, and 3 for a power estimate and then subtract the power estimates of Stages 1 and 2.

The ability to produce these types of power tables is integral for VLSI design. By including clock activation percentage as a variable in these power tables the estimates are more accurate. The present invention is flexible enough to handle power estimates for macros with multiple clock gating inputs. If the power consumption of every macro within a chip can be accurately estimated, then the entire chip's power consumption can be accurately estimated. With accurate power estimates designers can try to reduce the power consumption of macros, chips, and even complete systems. Minimizing power consumption can increase battery life, reduce packaging costs, and reduce power delivery costs.

Figure 10:
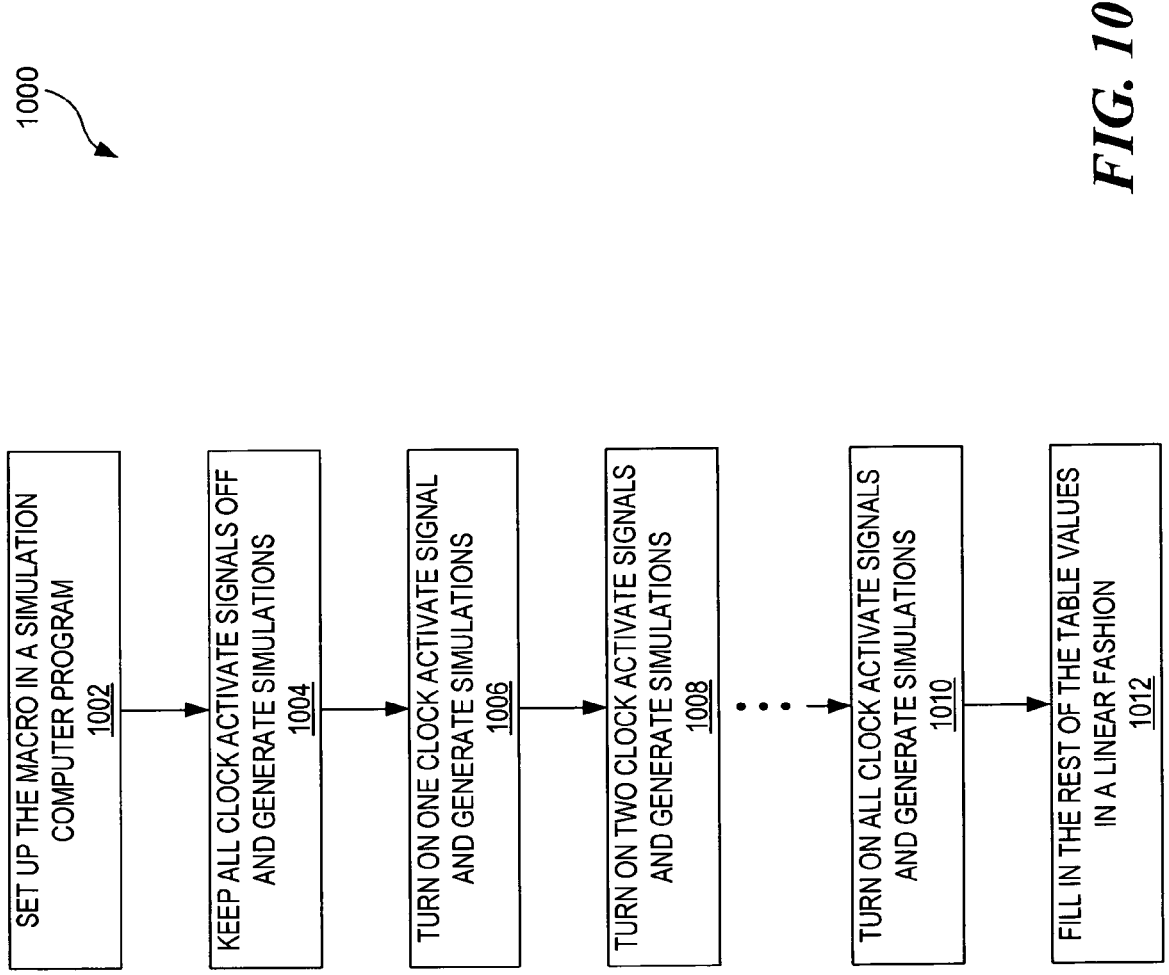
FIG. 10 is a flow chart depicting the method of producing a power table for a macro with multiple clock gating inputs based upon the input switching factor percentage and the clock activation percentage.

Referring to FIG. 10 of the drawings, reference numeral 1000 generally designates a flow chart depicting the method of producing a power table for a macro with multiple clock gating inputs based upon the input switching factor percentage and the clock activation percentage. First, the macro is set up in a simulation computer program in step 1002. Next, keep all of the clock activate signals off and generate simulations in step 1004. Then, turn on one clock activate signal and generate simulations in step 1006. Turn on two clock activate signals and generate simulations in step 1008. Continue this process until all clock activate signals are turned on and corresponding simulations are generated in step 1010. Finally, fill in the rest of the energy table values in a linear fashion in step 1012. The end result is a power table that accurately estimates the power consumption of a macro with multiple clock gating inputs.

It is understood that the present invention can take many forms and embodiments. Accordingly, several variations of the present design may be made without departing from the scope of the invention. The capabilities outlined herein allow for the possibility of a variety of programming models. This disclosure should not be read as preferring any particular programming model, but is instead directed to the underlying concepts on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for estimating the electrical power dissipation of a circuit receiving a first clock activate signal and a second clock activate signal, the method comprising:

forming a table of electrical power dissipation values of the circuit, wherein the table comprises a first section corresponding to a condition of the circuit wherein the first clock activate signal is on and the second clock activate signal is off, and wherein the table comprises a second section corresponding to a condition of the circuit wherein the first clock activate signal is on and the second clock activate signal is also on, and wherein the first and second sections each comprise a plurality of entries corresponding to different values of switching factor percentage and clock activation percentage; and accessing the table to estimate the electrical power dissipation of the circuit.

2. The method of claim 1, wherein the forming the table comprises:

generating at least one power dissipation value for the circuit with the first clock activate signal on and the second clock activate signal off;

inserting the at least one power dissipation value generated with the first clock activate signal on and the second clock activate signal off in the first section of the table;

generating at least one power dissipation value for the circuit with the first clock activate signal on and the second clock activate signal on; and inserting the at least one power dissipation value generated with the first clock activate signal on and the second clock activate signal on in the second section of the table.

3. The method of claim 2, wherein the generating at least one power dissipation value for the circuit with the first clock activate signal on and the second clock activate signal off comprises measuring power dissipation of the circuit during computer simulation of operation of the circuit with the first clock activate signal on and the second clock activate signal off.

4. The method of claim 3, wherein the generating at least one power dissipation value for the circuit with the first clock activate signal on and the second clock activate signal off comprises using at least two power dissipation values for the circuit with the first clock activate signal on and the second clock activate signal off to determine a third power dissipation value for the circuit with the first clock activate signal on and the second clock activate signal off.

* * * * *